United States Patent [19]
Temoshenko et al.

[11] Patent Number: 5,331,574
[45] Date of Patent: Jul. 19, 1994

[54] SYSTEM AND METHOD FOR COLLECTING RESPONSE TIMES FOR EXCEPTION RESPONSE APPLICATIONS

[75] Inventors: Leo Temoshenko, Carrboro; Harry F. Weddington, Jr., Cary, both of N.C.

[73] Assignee: International Business Machines Corporation, Armonk, N.Y.

[21] Appl. No.: 741,005

[22] Filed: Aug. 6, 1991

[51] Int. Cl.$^5$ .............................................. G01B 21/00
[52] U.S. Cl. ................... 364/551.01; 395/200; 395/275; 364/DIG. 1
[58] Field of Search ............ 364/514, 551.01, DIG. 1, 364/264, 264.4, 264.5, 569; 395/200, 275

[56] References Cited

U.S. PATENT DOCUMENTS

| | | | |
|---|---|---|---|
| 4,851,998 | 7/1989 | Hospodor | 364/569 |
| 4,905,171 | 2/1990 | Kiel et al. | 364/551.01 |
| 5,107,450 | 4/1992 | Lawrenz | 364/569 |

Primary Examiner—Jack B. Harvey
Assistant Examiner—Jae H. Choi
Attorney, Agent, or Firm—John J. Timar

[57] ABSTRACT

A system and method for performance monitoring of transactions which involve an application which normally operates in exception response mode. A network performance monitor sets information in memory regarding applications and resources for which performance data is sought. The applications are modified so that they check the appropriate locations in memory during the processing for each transaction to check whether the mode should be switched to definite response mode for that transaction. If so, the application switches to definite response mode, thereby causing a definite response path information unit to be sent by the resource following the resource's reception of the outbound path information unit from the application. The network performance monitor monitors the passage of these messages through a communication access means which operates the network. The network performance monitor uses the passage time of each message to obtain performance time for the given transaction relative to the given resource and at the application. Following the completion of each transaction, the application can return to exception response mode so that the definite response message will only be sent from the resource when performance monitoring is occurring, thereby reducing network overhead.

9 Claims, 4 Drawing Sheets

SYSTEM AND METHOD FOR COLLECTING RESPONSE TIMES FOR EXCEPTION RESPONSE APPLICATIONS

BACKGROUND OF THE INVENTION

1. Field of the Invention

The present invention relates to a system and a method for obtaining response times for exception response applications. More particularly, the present invention relates to a system and a method by which a network performance monitor is able to collect response times for transactions on a network which involve an exception response application without creating protocol violations in the network.

2. Description of the Related Art

Today, networks are commonplace tools which are employed to permit users of the network to access to a wide variety of information and computer resources. Commonly, a powerful computer, such as a mainframe, lies at the heart of a network. A communication access means (CAM), such as VTAM, which is a trademark of the IBM Corporation, is employed to operate the network. The CAM harnesses the power of the mainframe for multiple users, and the CAM permits each user to access the resources associated with the mainframe, such as terminals, printers, applications running on the mainframe and numerous other peripheral devices.

Networks can be employed in many different environments. Accordingly, the needs and requirements of users, owners or operators of each given network may be quite different. In this regard, a need developed to modify each CAM to meet the needs of the users of the particular network. In response to this need, network performance monitors (NPMs) were introduced to monitor the performance of CAMs in order to provide a means for determining whether the CAM is controlling the network in a manner which is most expedient for the users, as determined by the users. NPMs obtain transit time and volume statistics from CAMs for given resources and/or applications associated with the CAM and process this data to provide performance data, which is used for many purposes. For example, a CAM operator may use the performance data to modify the CAM so as to better serve the requirements of the users. Based on this data, the operator can speed up certain functions, change priorities, provide more equitable access to certain resources, etc.

However, one major drawback to the use of NPMs is that CAMs and applications and resources were not designed with NPMs in mind. NPMs were designed, therefore, to tap into CAMs in order to obtain statistics which can be processed to obtain appropriate data regarding the operation of the CAM and the interaction between the computer, the applications, the users (terminals) and the various resources of the network. For example, when a user at a terminal is using a CAM to access and run an application on the network, the total time or operator time involved is calculated by an NPM by summing host and network times for a given transaction involving the terminal and the application. However, this technique does not readily work when an application is running in exception response mode. The technique works effectively when the application is running in definite response mode. When in definite response mode, a user at a terminal initiates a transaction by sending a request or message (an inbound request path information unit or inbound PIU) to the application (via the CAM). The application processes the request and responds by sending a message (outbound PIU) to the terminal (via the CAM). The terminal notes its reception of the message by sending an appropriate message (inbound definite response PIU) to the application (via the CAM). The passage of each message through the CAM is detected and data associated therewith noted by the NPM. The NPM then processes the data to calculate response times including the host time, which is the time between the passage of the first and second messages, and the network time, which is the time between the passage of the second and third messages.

However, the sending of the definite response PIU adds no additional transfer of real data when the second message was received without error by the terminal, which occurs most of the time. Further, the sending of this third message means that about 33% more CAM, bus, and network time is used than would be used if just the first two messages were sent. On busy networks, use of the third message tends to slow the network significantly. Accordingly, applications were developed that run in what is known as exception response mode. In exception response mode, a third message from the terminal back to the application is sent only if a problem exists with the second message as received by the terminal from the application. However, when an NPM is gathering statistics for a transaction and an application running in exception response mode is involved in the transaction, the NPM is unable to obtain the data necessary to calculate the network time and thus the operator time.

To date, NPMs have attempted to resolve the problem caused by the lack of a third message for transactions processed by exception response mode applications by creating a third message in the network itself. Typically, the NPM intercepts the second message in the CAM and alters the second message so that it appears to the terminal that the application is running in definite response mode. Accordingly, the terminal generates and sends the third message. The NPM then intercepts the third message in the CAM, records the time it was received (and any other desired data) and discards the third message within the CAM before it reaches the application. However, significant problems exist with this technique. A significant percentage of these changes result in the protocol violation in the network which causes a session between the application and the user whose session is being monitored to hang or drop entirely. These protocol violations occur when, for example, the NPM loses track of which PIU was altered. Thus, the created PIU will not be intercepted and discarded, and, when such a PIU is received by an application in exception response mode, a protocol violation occurs. Further, it is not uncommon for the NPM to alter the wrong PIU or intercept and discard the wrong PIU, both of which will also result in protocol violations. Additionally, even on networks, the time it takes for a message to travel may not be insignificant, particularly if satellites are used to send messages. And, it is not uncommon for the application to send out a number of outbound PIUs over a short period of time. However, if a second outbound PIU is sent over the network prior to the created inbound definite response PIU being received and discarded by the network, a protocol violation occurs. Protocol violations can also result for a number of other reasons when the above technique is employed.

This technique also involves the use of table look-ups. When a PIU is detected in the CAM by the NPM, the PIU and thus the session are interrupted until the PIU header can be read and a determination made as to whether or not the PIU should be intercepted and deleted or whether a new table entry should be created based on the source or destination of the PIU. Since this process involves looking through relatively large tables, throughput speeds and thus response times are subject to being significantly slowed.

For some users, the slower speeds and the occasionally lost sessions are merely annoyances. However, for other users, such as those in financial or military fields, the loss of an individual session may not be tolerable.

SUMMARY OF THE INVENTION

Accordingly, an object of the present invention is to provide a monitoring technique for applications running in the exception response mode which does not cause protocol violations and thus the loss of sessions.

Another object of the present invention is to eliminate protocol violations caused by an NPM changing path information units in the network.

Yet another object of the present invention is to provide a system for providing performance data relative to applications which run in exception response mode which switches the application to definite response mode only for those transactions for which performance data is required.

Still another object of the present invention is to provide a technique for monitoring transactions relative to applications which normally operate in exception response mode without risking protocol violations.

Other objects and advantages of the present invention will be set forth in part in the description and the drawings which follow and, in part, will be obvious from the description or may be learned by practice of the invention.

To achieve the foregoing objects, and in accordance with the purpose of the invention as broadly described herein, a system is provided for obtaining performance data related to an application operating in exception response mode. The system includes means for communicating information to the application to switch to definite response mode for at least one transaction, means for monitoring for a message related to the at least one transaction, and means for obtaining performance data based on information obtained by the monitoring means. Preferably, the application runs on a network and the network includes a communication access means. The monitoring means monitors the communication access means for relative times at which messages related to each monitored transaction pass therethrough to and from the application. The performance data preferably include host and network times between messages passing back and forth between the application and a resource employing the application for each monitored transaction. The performance data can be sought relative to any application running in exception response mode or any resource employing such an application. Further, the communicating means preferably places information in memory accessible by the application, the information defining situations in which the application is to switch to definite response mode. Further, the messages can include an inbound path information unit bound for the application from a resource employing the application, an outbound path information unit bound for the resource from the application, and an inbound definite response path information unit bound for the application from the resource.

The invention also provides a method for performance monitoring of transactions in a network associated with applications operating in exception response mode. The method comprises the steps of modifying the applications to check memory during processing for instructions to change modes to definite response mode, placing instructions in the memory regarding applications and resources for which monitoring and thus mode changes are desired, monitoring for messages from transactions for which the application has changed to definite response mode, and processing data relative to the monitored messages to obtain performance data relative to the application and the resource employing the application. The modifying step may further comprise modifying the applications to check the memory relative to each transaction processed therein.

The present invention will now be described with reference to the following drawings, in which like reference numbers denote the same elements throughout.

DESCRIPTION OF THE PREFERRED EMBODIMENT

Figure 1:
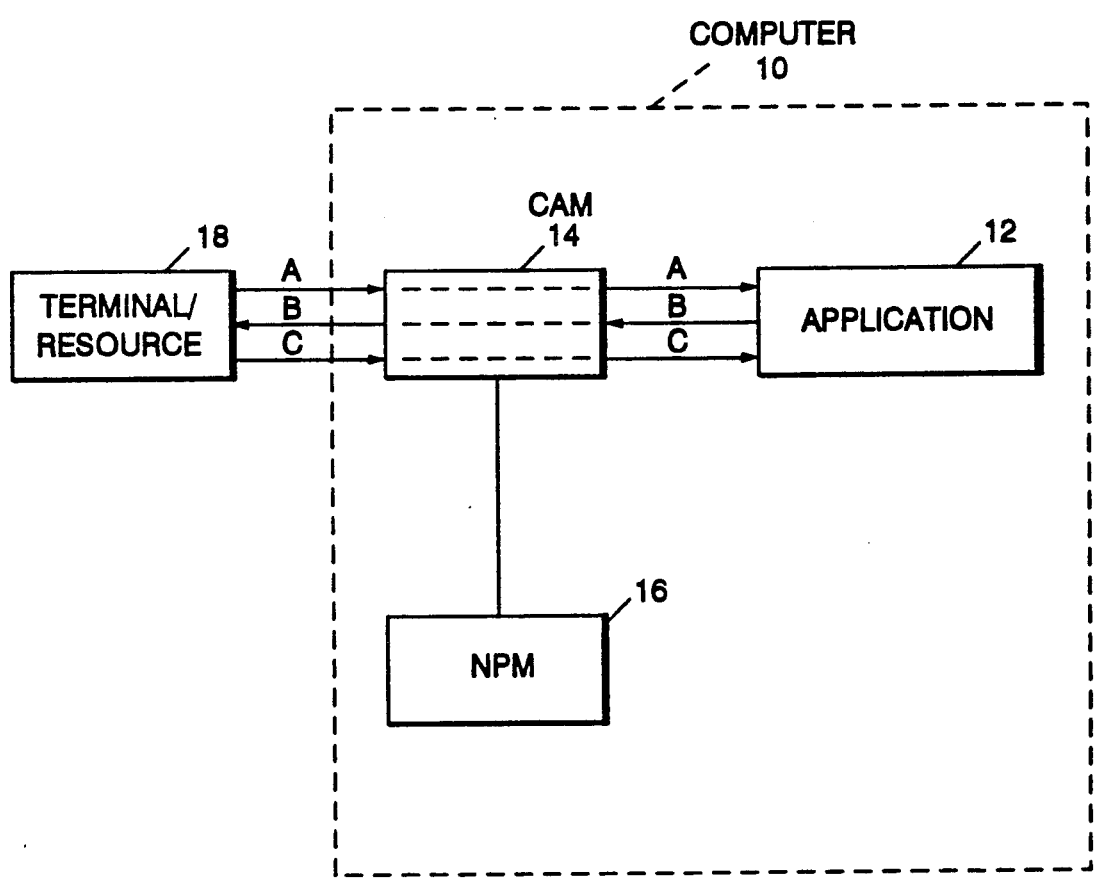
FIG. 1 is a block diagram of components in a network illustrating communications between a resource and an application operating in definite response mode.

A description of the preferred embodiment will be provided below following a brief description of the prior art and a description of a transaction which involves an application running in definite response mode, which is illustrated in the block diagram of FIG. 1.

Presently, one function of an NPM is to collect session statistics for transactions which utilize the application program interface (API) of a CAM. The statistics consist of transit times and volume measurements. The present invention is most concerned with transit times. NPMs refer to transit time as operator time. NPMs typically process raw data to calculate operator time by summing host and network times for a given transaction. These times as defined by an NPM can be explained with reference to FIG. 1, which illustrates in very general form the communication protocol between a computer 10 having an application 12 loaded therein which runs in definite response mode. A CAM 14 operates the network, and an NPM 16 monitors the performance of the network by monitoring the CAM 14. A single resource 18, which is a part of the network, is illustrated. For purposes of this description, the resource 18 will be referred to as a terminal, although it can be any one of a variety of other resources, such as a printer, another application, etc.

For each transaction in which the application involved is operating in definite response mode, three messages are passed over the network (and through the API of the CAM 14) between the application 12 and the resource 18. The transfer of these three messages between the terminal 18 and the application 12 is illustrated in FIG. 1. The first of these three sequential messages is message A, which represents an inbound path information unit (PIU) from the resource 18 to the application 12, which typically requests that the application perform processing for the resource. Next is message B, which represents the responding outbound PIU from the application 12 to the terminal 18. Last is message C, which represents the responding inbound definite response PIU from terminal 18 to the application 12.

As discussed previously, message C is eliminated when an application is operating in exception response mode, which significantly reduces overhead by reducing the necessary network and computer time for each transaction. However, in an NPM, host time is calculated by subtracting the time the inbound PIU (message A) passes the API of the CAM 14 from the time the outbound PIU (message B) passes the API, and the network time is calculated by subtracting the time the outbound PIU (message B) passes the API of the CAM 14 from the time the subsequent inbound definite response PIU (message C) passes the API. Clearly, this technique will not work when attempting to obtain data for transactions which employ applications running in exception response mode.

Currently, the most widespread solution to this problem in use is the technique discussed previously. This prior technique involves altering the header of the outbound PIU (message B) in the network or CAM 14 so that the terminal 18 will respond to message B as if the application 12 is running in definite response mode. However, as discussed, this technique exposes the session between the terminal 18 and application 12 to a wide variety of potential protocol violations. The altered message B causes the terminal 18 to generate an inbound definite response PIU (message C) in response to receiving the altered outbound PIU (message B). This artificially created inbound definite response PIU (message C) is supposed to be monitored for in the network by the NPM 16 for timing purposes and then discarded in the network by the NPM 16 before it reaches the application 12. However, as discussed, this often does not work as designed, and one of several protocol violations may result which cause the session with the terminal 18 to stop running and hang or be dropped completely by the application 12. Given the number of messages and quantities of data being passed back and forth by the CAM 14, these are not uncommon occurrences. Examples of known problems which cause violations include the NPM 16 losing track of which PIUs are generated, the NPM 16 inadvertently altering the wrong PIU, the NPM 16 intercepting and discarding the wrong PIU, and the application 12 sending a second outbound response PIU (message B) before the inbound definite response PIU (message C) is received within the network. This last problem can result from the data stream for message B being too long for a single PIU, necessitating multiple messages being sent by the application sequentially.

Figure 2:
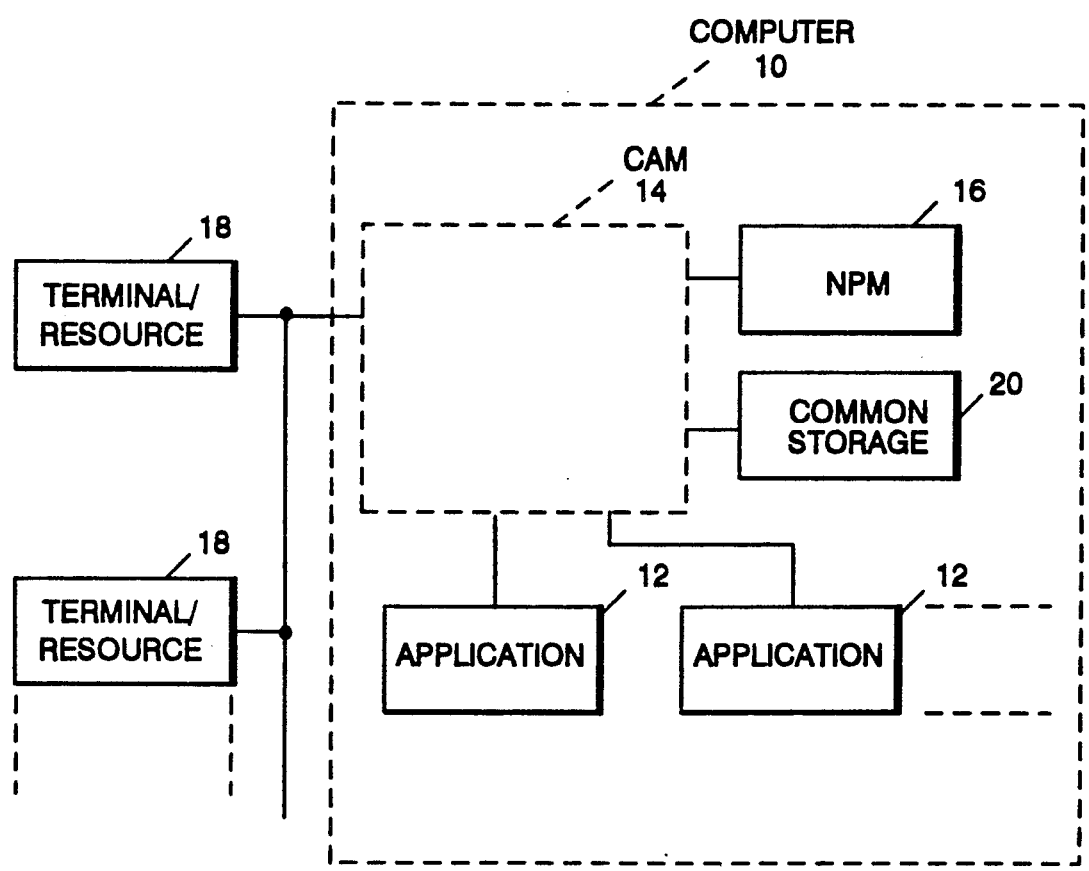
FIG. 2 is a block diagram of a system in which the present invention is embodied.

The present invention addresses the root of these problems in a unique fashion and will now be described with reference to FIGS. 2-4. FIG. 2 is a block diagram illustrating a portion of a network which includes a computer 10 having a number of applications 12 loaded therein. A CAM 14 operates the network and controls the links between the computer 10, the applications 12, common storage 20 resident within the computer 10 and resources in and out of the computer 10, including terminals 18. The NPM 16 is also resident in the computer 10 and monitors the performance of the network by monitoring for information being passed back and forth by the CAM 14. The present invention will be described with reference to a terminal 18, although element 18 can be any resource which interacts with an application.

Typically, a user at a terminal 18 will use the network to access one of the applications 12 resident on the system and establish a session therewith. In such a situation, the owner/operator/customer of the network may desire to monitor the transaction between the terminal/resource 18 and the application 12 to determine if the transaction is being carried out by the CAM 14 in the manner desired. For example, the owner may assign different priorities to different transactions and will want to know whether high priority transactions are being handled relatively quickly, and low priority transactions are being handled relatively slowly. The CAM 14 may need adjusting in order to implement such requirements, and the determination of whether the system requirements are being implemented can be determined by the NPM 16.

The NPM 16 can be employed by an operator to monitor any transaction in the network controlled by the CAM 14. For example, the transaction may be between a given application and a user at a given terminal 18, a given application 12 and all the terminals in a predetermined node, or a given application 12 and all the users of a given LAN. The transaction may also be between applications, between applications and printers, etc. In any of these cases, if the application 12 involved is running in the exception response mode, the problems discussed above are likely to occur during monitoring if the prior technique is employed by the NPM 16.

The present invention resolves these problems using the following fact. Most exception response applications are designed to run in either exception response mode or definite response mode. Accordingly, for a given transaction, the present invention causes an application to actually switch to definite response mode rather than artificially effect such a switch in the network. The present invention implements this solution in the following way. First, the application 12 is modified to take advantage of an existing exit type available to the application so that during processing of a transaction, the application 12 will exit and check NPM control blocks within the common storage 20 at a designated location therein. The application 12 is further modified to switch modes from exception response to definite response if an appropriate flag is found within NPM control blocks located in common storage 20. The NPM 16 sets a flag for a resource 18 or an application 12 for which monitoring of transactions is desired. In this way, for a given transaction involving a single session between an application 12 and a resource 18, the application 12 will switch to definite response mode if that transaction is being monitored by the NPM 16. By switching to the definite response mode at this time, message C will be generated. But none of the network protocol violations discussed above will occur, since message C will be expected due to the mode change. The NPM 16 will monitor the CAM 14 for the passage of message C therethrough, but will not intercept and discard it as done by the prior technique. Rather, message C will continue on to the application 12, where it is expected, completing the transaction.

Correspondingly, the NPM 16 must also be modified. When an operator indicates that monitoring is desired for an application running in exception response mode or for a resource which may utilize such an application, the NPM 16 sets appropriate flags in the designated NPM control blocks in the common storage 20. The prior art NPM function of intercepting and modifying message B and then intercepting and discarding created message C is eliminated. The actual implementation of these modifications are well within the purview of one skilled in the art, and will not be discussed in further detail. Such a modified system in operation, however, will be described below with reference to the flow charts of FIGS. 3 and 4.

Figure 3:
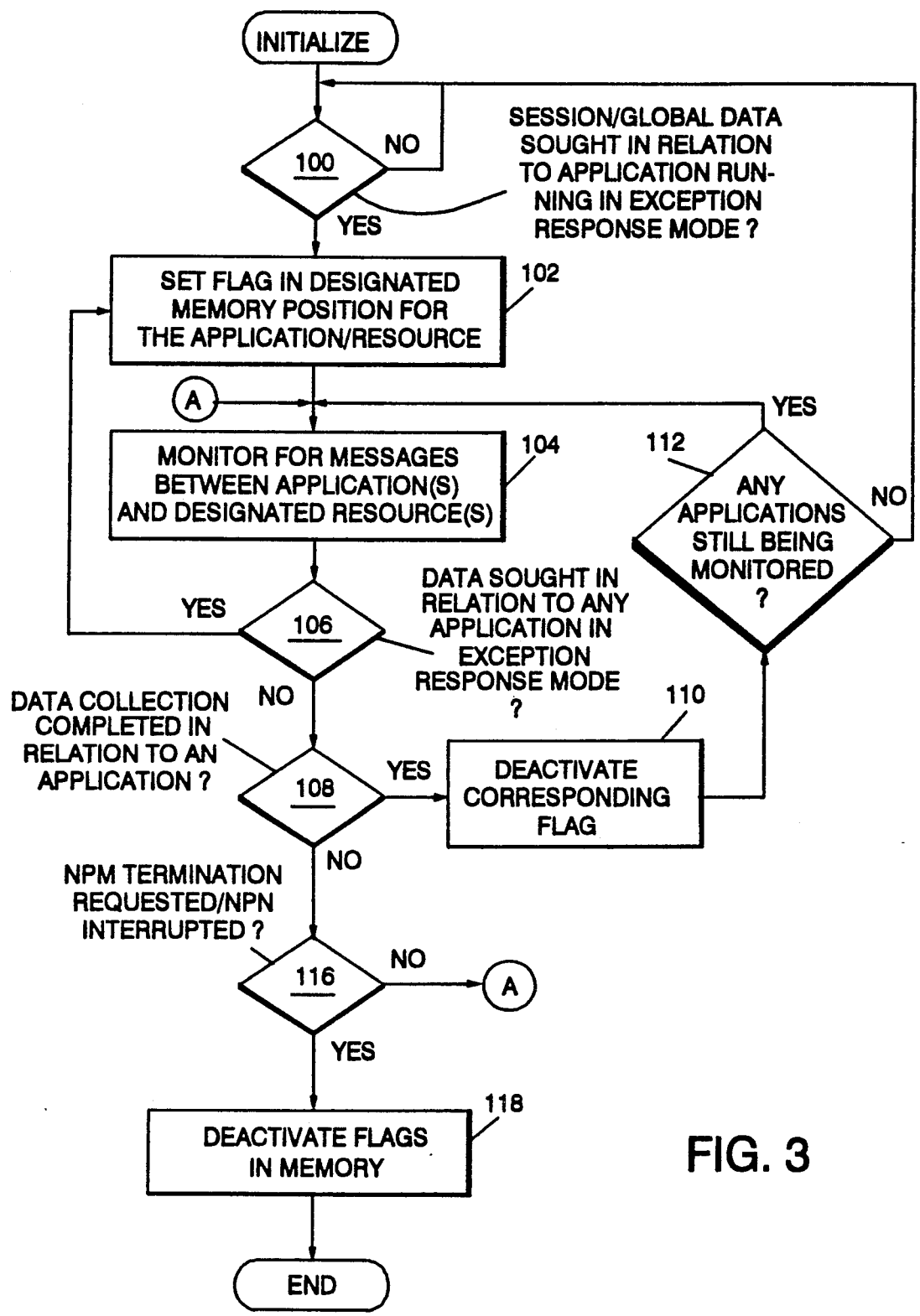
FIG. 3 is a flow chart illustrating the logic by which an NPM causes an application operating in exception response mode to switch modes in accordance with the present invention.
Figure 4:
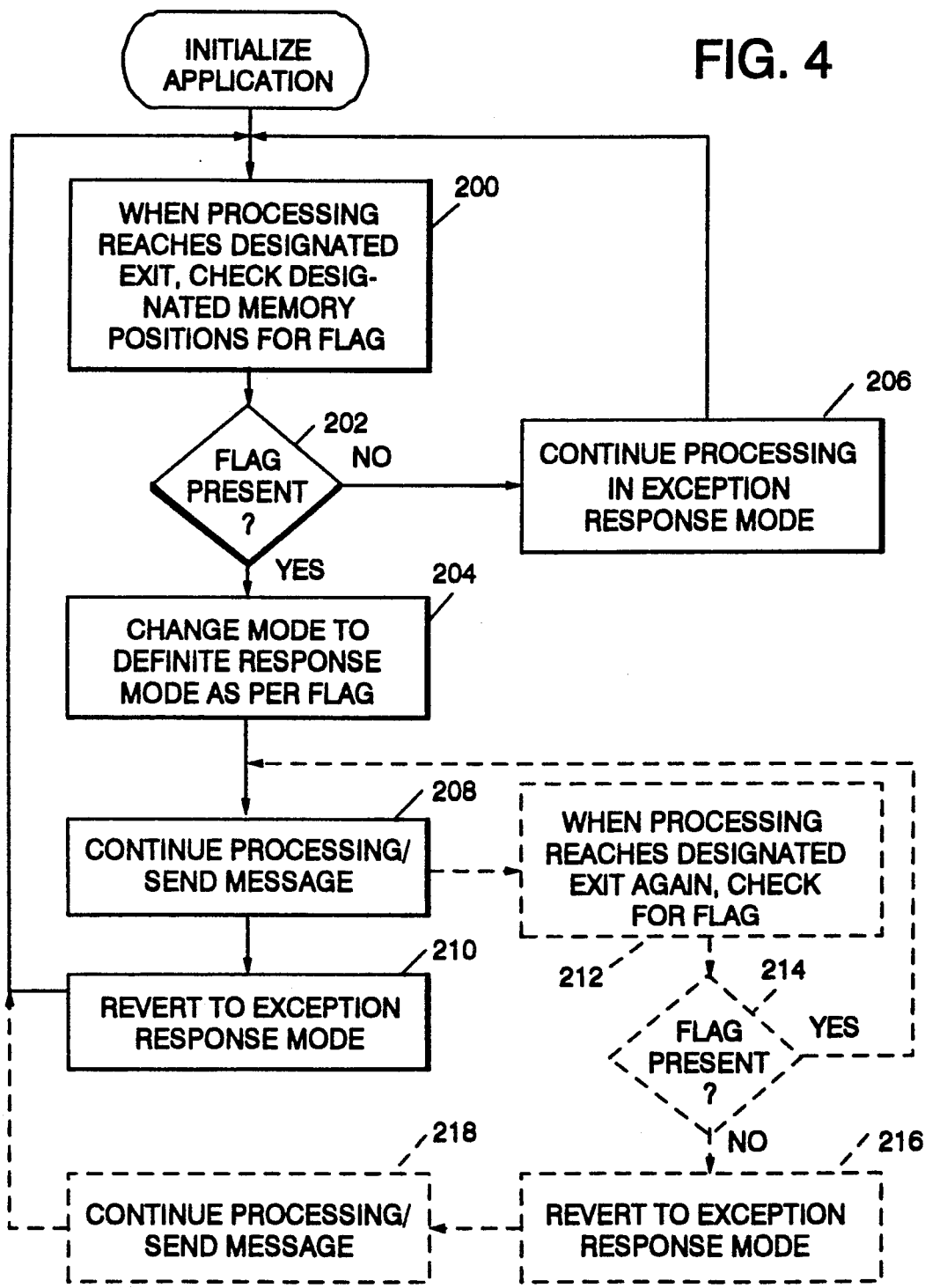
FIG. 4 is a flow chart of the steps carried out by an application in accordance with the present invention.

FIG. 3 illustrates a flow chart which details a subroutine for use with the NPM 16. After activating the NPM 16, the subroutine is entered if it is desired that session data for a given resource or resources or session data between a given resource and a given application or global data is sought for transactions between an application and any resource, and the application is running in exception response mode (step 100). The NPM 16 then sets a flag(s) in the NPM control blocks in the common storage 20 which corresponds to the application(s) or resource(s) (step 102). The NPM 16 then monitors the application program interface in the CAM 14 for any transactions associated with the designated resources or applications (step 104). At any time, an operator may desire that transactions involving other resources or applications which operate in exception response mode be monitored by NPM 16 (step 106). In this case, the NPM 16 sets the appropriate flag(s) in the control blocks (step 102). Further, the operator may wish to cease monitoring in relation to a given application or resource which may employ an exception response application (step 108). In this case, the corresponding flag in the NPM control blocks is deactivated (step 110). Following the deactivation of any such flag, if any flags remain set in the control block (step 112), then the NPM 16 continues to monitor for these messages relative to any such designated resources or applications. If no such flags are set, the subroutine ends but the NPM 16 may continue to operate. An operator may initialize this sub-routine again and cause a flag to be set at any time if any of the above described transactions are to be monitored. Additionally, should the operator terminate the NPM session or if the NPM session is interrupted (step 116), then all remaining flags in the control blocks are deactivated (step 118). However, as long as any flag remains set, the subroutine remains active, and any of steps 102 through 116 may be carried out at any time.

The operation of this technique from the perspective of an application running in exception response mode will now be described with reference to the flow chart of FIG. 4. Obviously, any time a network is in operation, an application available on the network may be called upon in response to a request by a resource in the network, and the application will work on the request and begin processing relative to that request. The above-discussed exit is placed in the application so that, during processing, the application will reach the designated exit. On arrival at the exit, the application queries the NPM control blocks in the common storage 20 in accordance to known techniques to check if any flags appropriate to the transaction at hand have been set (step 200). Depending upon the requirements of the NPM operator, flags can be set which correspond to all the transactions being carried out by a preselected application(s) or only those transactions involving selected resources. If any such flag is found to be present within the control blocks (step 202), then the application changes modes to the definite response mode with regard to the processing being carried out for the transaction at hand (step 204). If no such flag is found to be present in the control blocks, then processing for the transaction at hand is completed in exception response mode (step 206). When processing is requested for the next transaction, a check of the control blocks will once again be carried out (step 200). Given the speed of computers, such an exit and query only negligibly affect the speed of the processing.

If the appropriate flag is found to be present in step 202, then the application changes to definite response mode (step 204) and processing is finished for the given transaction and a message B is sent definite response mode (step 208). In the preferred embodiment, upon completion of the processing for the transaction, the application reverts back to exception response mode (step 210). During processing for the next transaction, the mode may or may not be switched to definite response mode, depending on whether an appropriate flag is found in the control blocks in step 202.

Alternatively, the mode may be maintained in definite response mode after processing for a given transaction is completed. The logic for this alternate is indicated by the dashed lines of FIG. 4. After processing begins for the next transaction and the exit is reached, the appropriate control blocks are checked for any pertinent flag (step 212). If a flag pertinent to this new transaction is not set in the NPM control blocks (step 214), then the application reverts to exception response mode (step 216) and processing is continued and the appropriate message B sent in accordance with exception response mode processing (step 218). In this case, no message C is returned by the resource, but no monitoring for message C is being conducted by the NPM 16. Processing is then started for the next transaction with the application running in the exception response mode and logically beginning at step 200. On the other hand, if a flag is found to be present in step 214, then processing continues in definite response mode and a message is sent in accordance with definite response mode processing, as per step 208. The application remains in definite response mode for subsequent transactions until no appropriate flag is found to be present in step 214.

While a preferred embodiment of the present invention has been described, variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is desired to be protected by Letters patent is:

We claim:

1. A system for obtaining performance data related to an application running in exception response mode, comprising:

means for communicating information to the application running in exception response to switch dynamically to definite response mode for a selected resource for at least one transaction;

means for monitoring for messages related to the at least one transaction; and means for obtaining performance data based on data from said monitoring means.

2. The system for obtaining performance data according to claim 1, wherein the application runs on a network, the network includes a communication access means, and said monitoring means monitors the communication access means for relative times at which messages related to the at least one transaction pass therethrough to and from the application.

3. The system for obtaining performance data according to claim 2, wherein the performance data include host and network times between messages passing back and forth between the application and a resource employing the application for each of the at least one transaction.

4. The system for obtaining performance data according to claim 1, wherein the performance data can be sought relative to any one of the application and one or more resources employing the application.

5. The system for obtaining performance data according to claim 1, wherein said communicating means sets information in memory accessible by the application which defines situations to switch to definite response mode.

6. The system for obtaining performance data according to claim 1, wherein the messages include an inbound path information unit bound for the application from a resource employing the application, an outbound path information unit bound for the resource from the application and an inbound definite response path information unit bound for the application from the resource.

7. The system for obtaining performance data according to claim 1 wherein said means for communicating information includes means for deactivating said definite response mode for said selected resource to revert dynamically to exception response mode for said selected resource following said at least one transaction.

8. A method for performance monitoring of transactions in a network associated with applications operating in exception response mode, comprising the steps of:

a) modifying the applications to check memory for instructions for changing modes;

b) placing the instructions in memory regarding applications and resources for which mode changes are desired;

c) monitoring for messages for transactions for which any application has changed modes to definite response mode; and d) processing data relative to the monitored messages to obtain performance data relative to the applications and resources employing the application.

9. The method according to claim 8, wherein said step a further comprises modifying the applications to check the memory relative to each transaction processed therein.

* * * * *